(12) United States Patent
Li et al.

(10) Patent No.: US 10,837,535 B2
(45) Date of Patent: Nov. 17, 2020

(54) TORQUE CONVERTER ASSEMBLY AND A VEHICLE INCLUDING THE TORQUE CONVERTER ASSEMBLY

(71) Applicant: GM Global Technology Operations LLC, Detroit, MI (US)

(72) Inventors: Dongxu Li, Troy, MI (US); Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 90 days.

(21) Appl. No.: 16/193,299

(22) Filed: Nov. 16, 2018

(65) Prior Publication Data

US 2020/0158219 A1 May 21, 2020

(51) Int. Cl.
*F16H 45/02* (2006.01)
*F16H 45/00* (2006.01)

(52) U.S. Cl.
CPC ....... *F16H 45/02* (2013.01); *F16H 2045/002* (2013.01); *F16H 2045/0205* (2013.01); *F16H 2045/0252* (2013.01); *F16H 2045/0294* (2013.01)

(58) Field of Classification Search
None
See application file for complete search history.

(56) References Cited

U.S. PATENT DOCUMENTS

| | | | | |
|---|---|---|---|---|
| 5,377,796 A * | 1/1995 | Friedmann | ........ | F16F 15/13423 192/213 |
| 5,662,194 A * | 9/1997 | Jackel | ...................... | F16H 45/02 192/103 F |
| 5,669,475 A * | 9/1997 | Matsuoka | ............... | F16H 45/02 192/3.29 |
| 6,494,303 B1 * | 12/2002 | Reik | ....................... | F16H 45/02 192/212 |
| 6,547,051 B2 * | 4/2003 | Yoshimoto | .............. | F16H 45/02 192/212 |
| 8,132,655 B2 * | 3/2012 | Sturgin | ................... | F16H 45/02 192/3.25 |

(Continued)

FOREIGN PATENT DOCUMENTS

DE 4213341 A1 11/1992
DE 19613660 A1 10/1996

(Continued)

*Primary Examiner* — Ernesto A Suarez
*Assistant Examiner* — James J Taylor, II
(74) *Attorney, Agent, or Firm* — Quinn IP Law (57) ABSTRACT

A torque converter assembly includes a pump and a turbine fluidly connected together. A vehicle includes the assembly operable between an output shaft of an engine and an input member of a transmission. The assembly includes a damper and a clutch operable between the pump and the turbine. The damper is operable upstream from the clutch such that oscillation from the pump is reduced by the damper before oscillation reaches the clutch. The clutch includes first and second plates and a friction plate disposed between the first and second plates. The assembly includes a casing that contains the pump, the turbine, the damper and the clutch. A first part of the casing and the first plate define a first chamber. A first part of the turbine and the second plate define a second chamber. The clutch between the first and second plates defines a third chamber.

20 Claims, 2 Drawing Sheets

(56) References Cited

U.S. PATENT DOCUMENTS

| | | | | |
|---|---|---|---|---|
| 10,337,595 B2 * | 7/2019 | Hilty | ............... | F16D 25/0635 |
| 10,393,223 B2 * | 8/2019 | Hertel | ............... | F16F 15/13121 |
| 2018/0195594 A1 | 7/2018 | Li | | |

FOREIGN PATENT DOCUMENTS

| | | | |
|---|---|---|---|
| DE | 10024191 A1 | | 11/2000 |
| JP | 2010190264 A | * | 9/2010 |

* cited by examiner

TORQUE CONVERTER ASSEMBLY AND A VEHICLE INCLUDING THE TORQUE CONVERTER ASSEMBLY

INTRODUCTION

A vehicle may include an engine and a transmission coupled to the engine. Generally, the transmission is coupled to the engine to receive torque outputted from the engine. The vehicle may include a torque converter connected to an output shaft of the engine and an input member of the transmission. The torque converter may provide the desired multiplication of torque from the engine into the transmission.

SUMMARY

The present disclosure provides a torque converter assembly including a pump and a turbine fluidly connected to the pump. The torque converter assembly also includes a damper operable upstream from the turbine. The damper is configured to reduce oscillation from the pump toward the turbine. The torque converter assembly further includes a clutch operable between the pump and the turbine. The clutch includes a first plate and a second plate spaced from each other. The clutch also includes a friction plate disposed between the first and second plates. The clutch is operable in a slip condition in which pressure applied to the friction plate via the first and second plates is adjustable to allow the pump and the turbine to slip relative to each other to control oscillation through the clutch to the turbine. The damper is operable upstream from the clutch such that oscillation from the pump is reduced by the damper before oscillation reaches the clutch. The torque converter assembly also includes a casing that contains the pump, the turbine, the damper and the clutch. A first part of the casing and the first plate define a first chamber. A first part of the turbine and the second plate define a second chamber. The clutch between the first and second plates defines a third chamber. The first plate and/or the second plate are movable to equalize pressure between the first and second chambers when the clutch is in the slip condition, and pressure in the third chamber is adjustable according to the pressure being equalized in the first and second chambers.

The torque converter assembly optionally includes one or more of the following:

A) the clutch includes an arm fixed to the turbine;
B) the arm supports the friction plate;
C) the first and second chambers are in fluid communication with each other through the arm;
D) the turbine includes a hub defining a passageway in fluid communication with the third chamber;
E) the first plate of the clutch includes a first flange that abuts the hub and the second plate of the clutch includes a second flange that abuts the hub;
F) the passageway is in fluid communication with the third chamber between the first and second flanges;
G) the clutch includes a biasing member disposed between the first and second plates, and the biasing member is attached to the first and second plates;
H) the biasing member splits the third chamber into two halves;
I) the biasing member defines an aperture to fluidly connect the two halves of the third chamber;
J) the friction plate is coupled to the arm;
K) the arm, the first plate and the first part of the casing further define the first chamber;
L) the arm, the second plate and the first part of the turbine further define the second chamber;
M) the turbine includes a shell, and the arm is fixed to the shell of the turbine;
N) the first part of the turbine is further defined as the shell;
O) the arm, the second plate and the shell further define the second chamber;
P) the hub fixed to the shell;
Q) a portion of the first plate abuts the hub and a portion of the second plate abuts the hub;
R) the pump is rotatable to transfer torque through the damper and the clutch to the turbine when the clutch is operable in the slip condition or a full-lock condition;
S) the damper is operable upstream from the clutch and the turbine relative to a direction that torque is transferred;
T) the pump is operable upstream from the damper, the clutch and the turbine relative to the direction that torque is transferred;
U) the damper is operable between the pump and the clutch relative to the direction that torque is transferred;
V) the clutch is operable between the damper and the turbine relative to the direction that torque is transferred;
W) the damper includes an input plate directly coupled to the casing and an output plate directly coupled to the first plate;
X) the first plate of the clutch includes a first end and a second end spaced from each other;
Y) the second plate of the clutch includes a first end and a second end spaced from each other;
Z) the friction plate is disposed closer to the first end of the first plate than the second end of the first plate, and the friction plate is disposed closer to the first end of the second plate than the second end of the second plate;
AA) the second end of the first plate is disposed closer to the hub than the first end of the first plate, and the second end of the second plate is disposed closer to the hub than the first end of the second plate;
BB) the arm fixed to the shell of the turbine, and the friction plate is supported by the arm;
CC) the biasing member is disposed closer to the hub than the friction plate;
DD) the first and second chambers are filled with a first liquid fluid; and
EE) the third chamber is filled with a second liquid fluid that is separated from the first liquid fluid.

The present disclosure also provides a torque converter assembly including a pump and a turbine fluidly connected to the pump. The torque converter assembly also includes a damper operable upstream from the turbine. The damper is configured to reduce oscillation from the pump toward the turbine. The torque converter assembly further includes a clutch operable between the pump and the turbine. The clutch includes a first plate and a second plate spaced from each other. The clutch also includes a friction plate disposed between the first and second plates. The damper is operable upstream from the clutch such that oscillation from the pump is reduced by the damper before oscillation reaches the clutch. The torque converter assembly also includes a casing that contains the pump, the turbine, the damper and the clutch. A first part of the casing and the first plate define a first chamber. A first part of the turbine and the second plate define a second chamber. The clutch between the first and second plates defines a third chamber. The first chamber and the second chamber are filled with a first liquid fluid, and the third chamber is filled with a second liquid fluid that is separated from the first liquid fluid.

The torque converter assembly optionally includes one or more of the following:

A) the clutch includes an arm fixed to the turbine;
B) the arm supports the friction plate;
C) the first and second chambers are in fluid communication with each other through the arm;
D) the turbine includes a hub defining a passageway in fluid communication with the third chamber;
E) the damper includes an input plate directly coupled to the casing and abuts the hub of the turbine to prevent the second liquid fluid from mixing with the first liquid fluid at that location;
F) the clutch includes a biasing member attached to the first and second plates; the biasing member is disposed closer to the hub than the friction plate;
G) the biasing member splits the third chamber into two halves; and
H) the biasing member defines an aperture to fluidly connect the two halves of the third chamber.

Additionally, the present disclosure provides a vehicle including an engine and a transmission. The engine includes an output shaft and the transmission includes an input member. The vehicle also includes a torque converter assembly operable between the output shaft and the input member. The torque converter assembly includes a pump and a turbine fluidly connected to the pump. The torque converter assembly also includes a damper operable upstream from the turbine. The damper is configured to reduce oscillation from the pump toward the turbine. The torque converter assembly further includes a clutch operable between the pump and the turbine. The clutch includes a first plate and a second plate spaced from each other. The clutch also includes a friction plate disposed between the first and second plates. The clutch is operable in a slip condition in which pressure applied to the friction plate via the first and second plates is adjustable to allow the pump and the turbine to slip relative to each other to control oscillation through the clutch to the turbine. The damper is operable upstream from the clutch such that oscillation from the pump is reduced by the damper before oscillation reaches the clutch. The torque converter assembly also includes a casing that contains the pump, the turbine, the damper and the clutch. A first part of the casing and the first plate define a first chamber. A first part of the turbine and the second plate define a second chamber. The clutch between the first and second plates defines a third chamber. The first plate and/or the second plate are movable to equalize pressure between the first and second chambers when the clutch is in the slip condition, and pressure in the third chamber is adjustable according to the pressure being equalized in the first and second chambers.

The vehicle optionally includes one or more of the following:

A) the clutch includes an arm fixed to the turbine;
B) the arm supports the friction plate;
C) the first and second chambers are in fluid communication with each other through the arm;
D) the turbine includes a hub defining a passageway in fluid communication with the third chamber;
E) the torque converter assembly includes a turbine shaft directly coupled to the input member of the transmission;
F) the turbine shaft defines a hole in fluid communication with the passageway;
G) the damper includes an input plate directly coupled to the casing and an output plate directly coupled to the first plate;
H) the first chamber and the second chamber are filled with a first liquid fluid;
I) the third chamber is filled with a second liquid fluid that is separated from the first liquid fluid;
J) the second liquid fluid travels through the hole of the turbine shaft and the passageway of the hub;
K) the input plate is directly coupled to the casing and abuts the hub of the turbine to prevent the second liquid fluid from mixing with the first liquid fluid at that location;
L) a plate is fixed to the output shaft of the engine, and the casing is fixed to the plate;
M) the input plate is secured to the plate through the casing;
N) the output shaft of the engine is rotatable to transfer torque in a direction to the input member of the transmission through the torque converter assembly;
O) the damper is operable upstream from the clutch and the turbine relative to the direction that torque is transferred;
P) the first plate of the clutch includes a first end and a second end spaced from each other;
Q) the second plate of the clutch includes a first end and a second end spaced from each other;
R) the friction plate is disposed closer to the first end of the first plate than the second end of the first plate, and the friction plate is disposed closer to the first end of the second plate than the second end of the second plate;
S) the second end of the first plate is disposed closer to the hub than the first end of the first plate, and the second end of the second plate is disposed closer to the hub than the first end of the second plate;
T) the turbine includes a shell that is fixed to the hub;
U) the clutch includes an arm fixed to the shell of the turbine, and the friction plate is supported by the arm;
V) the clutch includes a biasing member attached to the first and second plates, and the biasing member is disposed closer to the hub than the friction plate;
W) a stator assembly that is coupled to a stator shaft that defines a passage, and the first liquid fluid is supplied to the pump via the passage of the stator shaft and then to the first and second chambers;
X) the second liquid fluid is supplied to the third chamber via the passageway; and
Y) control of the first liquid fluid via the passage of the stator shaft which is separately from control of the second liquid fluid via the hole of the turbine shaft.

The detailed description and the drawings or Figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Figure 1:
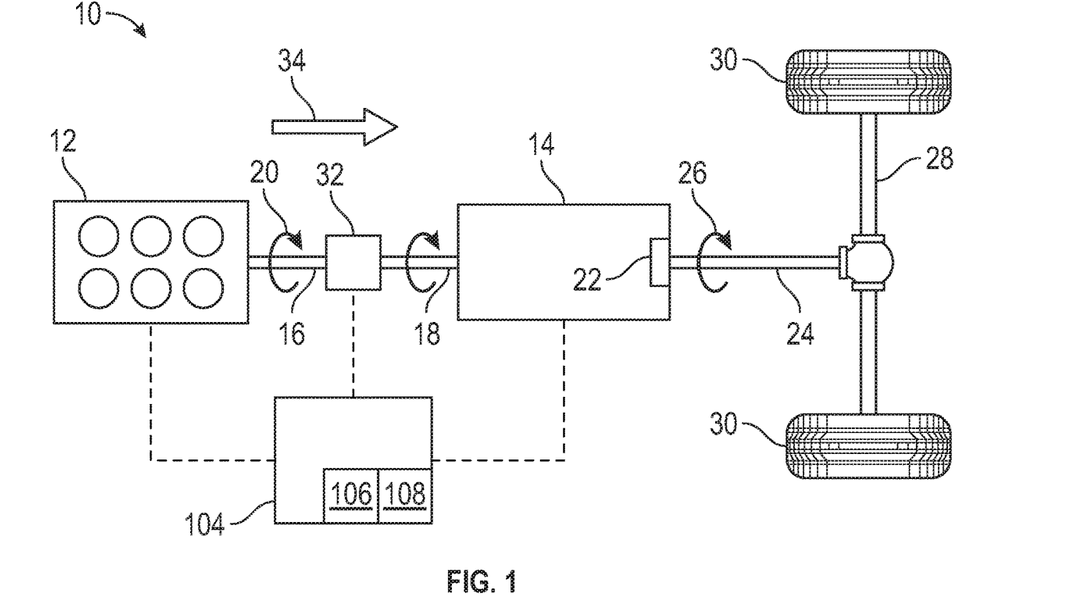
FIG. 1 is a schematic illustration of a vehicle including a torque converter assembly.

Referring to the Figures, wherein like numerals indicate like or corresponding parts throughout the several views, a vehicle 10 is generally shown in FIG. 1. Non-limiting examples of the vehicle 10 may include cars, trucks, all-terrain vehicles, off-road vehicles, recreational vehicles, aircrafts, boats, watercrafts, farm equipment or any other suitable movable platform.

Continuing with FIG. 1, the vehicle 10 may include an engine 12 and a transmission 14 coupled to the engine 12. Generally, the transmission 14 is coupled to the engine 12 to receive torque outputted from the engine 12. The engine 12 may be an internal combustion engine or any other suitable type of engine. The engine 12 may include an output shaft 16, and the transmission 14 may include an input member 18. The output shaft 16 of the engine 12 rotates at an engine speed (see arrow 20), and torque from rotation of the output shaft 16 is transferred to the input member 18 of the transmission 14, which causes the input member 18 to rotate. The powertrain of the vehicle 10 may include one or more electric traction motors in an optional hybrid configuration to provide additional sources of input torque. Non-limiting examples of the transmission 14 may include automatic transmission, dual clutch transmission, automated manual transmission, continuously variable transmission (CVT), etc.

Again continuing with FIG. 1, the transmission 14 may include a final drive 22 coupled to the input member 18 and an output member 24 that delivers output torque (see arrow 26) to one or more drive axles 28 through the final drive 22, and ultimately to a set of wheels 30. Therefore, torque from the engine 12 is transferred to the transmission 14, and the transmission 14 outputs torque to drive the wheels 30. It is to be appreciated that the final drive 22 may be driven by an endless rotatable member, and non-limiting examples of the endless rotatable member may include a belt or a chain.

Figure 2:
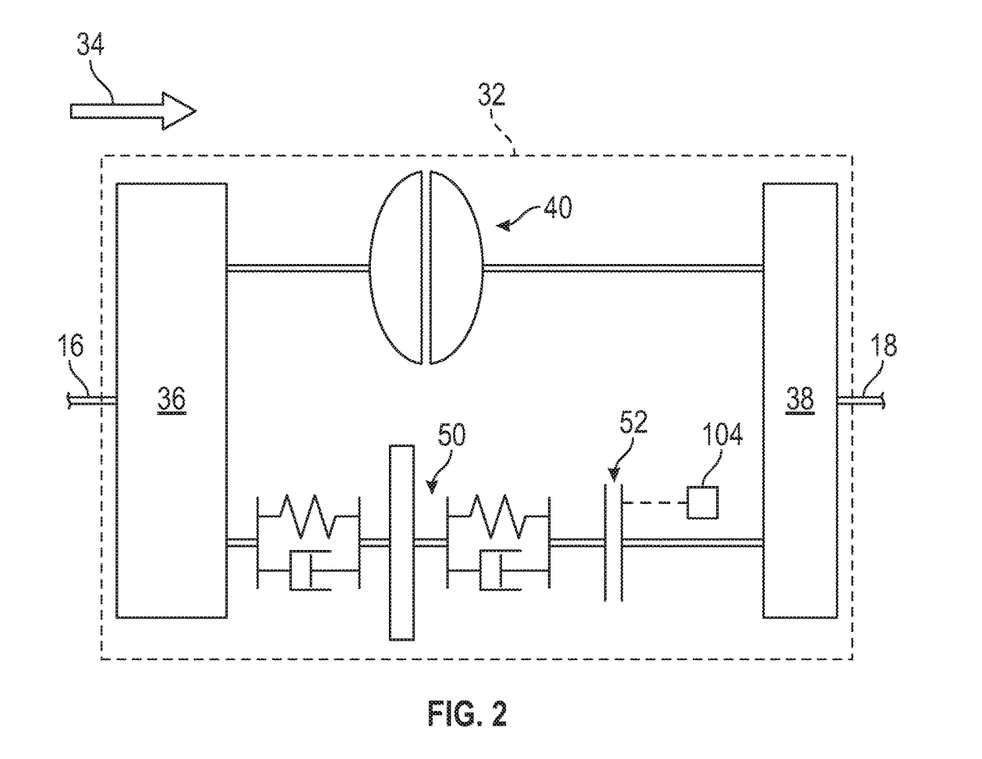
FIG. 2 is a schematic illustration of the torque converter assembly.
Figure 3:
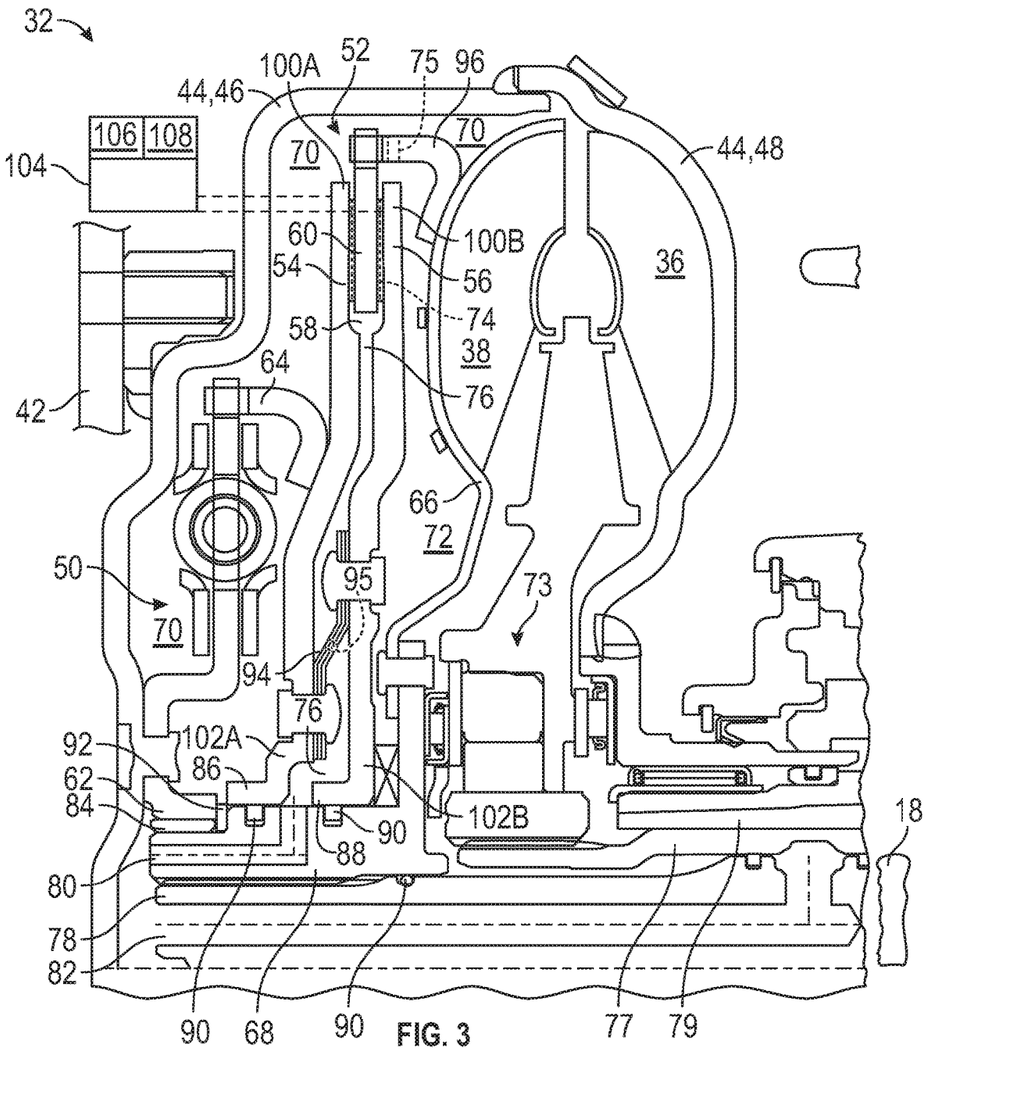
FIG. 3 is a schematic fragmentary illustration of the torque converter assembly.

Referring to FIGS. 1-3, a torque converter assembly 32 may be utilized. In certain configurations, the vehicle 10 may include the torque converter assembly 32 described herein. In the vehicle application, the torque converter assembly 32 is operable between the output shaft 16 and the input member 18. For example, the torque converter assembly 32 may be connected to the output shaft 16 of the engine 12 and the input member 18 of the transmission 14. As such, the output shaft 16 of the engine 12 is rotatable to transfer torque in a direction to the input member 18 of the transmission 14 through the torque converter assembly 32. Therefore, the direction that torque is transferred is illustrated by arrow 34 (see FIGS. 1 and 2). The torque converter assembly 32 may provide the desired multiplication of torque from the engine 12 into the transmission 14 at low speeds.

Operation of the engine 12 creates oscillations, which is transferred through the output shaft 16 to the torque converter assembly 32. For example, as the engine 12 operates, vibrations are created by the moving parts. As such, operation of the engine 12 outputs torque, which creates oscillations in the output shaft 16. The torque converter assembly 32, as detailed below, reduces an amount of oscillation being outputted therefrom. As such, in certain configurations, the torque converter assembly 32 also reduces the amount of oscillation transferred to the transmission 14 from the engine 12.

Referring to FIGS. 2 and 3, the torque converter assembly 32 includes a pump 36 and a turbine 38 fluidly connected to the pump 36. Hence, the pump 36 and the turbine 38 are operable through a fluid coupling 40, in which fluid that moves through the pump 36, due to rotation of the pump 36, is transferred to the turbine 38 which causes rotation of the turbine 38. Generally, in the vehicle application, the pump 36 is coupled to the output shaft 16 of the engine 12 and the turbine 38 is coupled to the input member 18 of the transmission 14. Furthermore, the pump 36 and the turbine 38 are each rotatable. The pump 36 and the turbine 38 may be rotatable concurrently or independently of each other. A fluid is transferred from the pump 36 to the turbine 38, and back again, in a loop during rotation of the pump 36 and the turbine 38. The fluid may be a liquid fluid, and non-limiting examples of the liquid fluid may include transmission fluid, oil, synthetic oil, etc.

The engine 12 may include a plate 42 (see FIG. 3) fixed to the output shaft 16 (of the engine 12). The plate 42 may be directly or indirectly fixed to the output shaft 16. Therefore, the plate 42 and the output shaft 16 are rotatable concurrently. As such, the plate 42 rotates that the same speed as that the output shaft 16. The plate 42 may be referred to as a flywheel, a drive plate or a flex plate.

Continuing with FIG. 3, the torque converter assembly 32 may include a casing 44. Generally, the casing 44 may be fixed to the plate 42 (of the engine 12), either directly or indirectly. The casing 44 and the plate 42 of the engine 12 are secured to each other such that the casing 44 and the plate 42 rotate at the same speed. The casing 44 may contain the pump 36 and the turbine 38, and additional parts, some of which are discussed further below.

Furthermore, the casing 44 may be split into separate pieces, for example, the casing 44 may include a first casing portion 46 and a second casing portion 48 (see FIG. 3). As shown in FIG. 3, the plate 42 may be fixed to the output shaft 16 through the casing 44, and more specifically through the first casing portion 46. The second casing portion 48 may house at least part of the pump 36. Movement of the second casing portion 48 causes movement of the pump 36.

In FIG. 3, the first casing portion 46 is fixed to the plate 42 by one or more fasteners, such as a bolt, a pin, etc., or welded thereto. The second casing portion 48 is fixed (either directly or indirectly) to the first casing portion 46 by one or more fasteners, such as a bolt, a pin, etc., or welded thereto. The pump 36 is rotatable with the plate 42 through the casing 44. Therefore, the plate 42, the output shaft 16 and the pump 36 are rotatable concurrently. As such, the pump 36 rotates at the same speed as that the output shaft 16. Rotation of the pump 36 causes the fluid inside the pump 36 to move toward the turbine 38. Movement of the fluid into the turbine 38 from the pump 36 causes the turbine 38 to rotate. As such, the pump 36 and the turbine 38 are fluidly connected. The pump 36 is rotatable to transfer torque through the turbine 38. The turbine 38 may rotate at the same speed or a different speed from the pump 36, which is discussed further below.

Referring to FIGS. 2 and 3, the torque converter assembly 32 further includes a damper 50 operable upstream from the turbine 38. Furthermore, the damper 50 is operable in a parallel relationship relative to the fluid coupling 40 between the pump 36 and the turbine 38. As best shown in FIG. 3, the damper 50 is operable upstream from the turbine 38 relative to the direction that torque is transferred. The damper 50 is configured to reduce oscillation from the pump 36 toward the turbine 38. As such, oscillations from the engine 12 are transferred to the damper 50 through the pump 36, and the damper 50 reduces those oscillations.

Continuing with FIGS. 2 and 3, the torque converter assembly 32 also includes a clutch 52 operable between the pump 36 and the turbine 38. Generally, the damper 50 is operable upstream from the clutch 52 and the turbine 38 relative to the direction that torque is transferred. The clutch 52 may be configured to operate in different conditions, such as slip, full-lock and open, as discussed further below.

The clutch 52 may operate to allow slip between the pump 36 and the turbine 38, which allows the turbine 38 to rotate at a different speed from the pump 36. The pump 36 and the turbine 38 rotate at different speeds when the clutch 52 is in a slip condition. The pump 36 is rotatable to transfer torque through the damper 50 and the clutch 52 to the turbine 38 when the clutch 52 is operable in the slip condition or in a full-lock condition (which is discussed further below). Generally, the clutch 52 is operable in the slip condition in which the clutch 52 is adjustable to allow the pump 36 and the turbine 38 to slip relative to each other to control oscillation through the clutch 52 to the turbine 38. Therefore, allowing slip to occur between the pump 36 and the turbine 38 also reduces the amount of oscillation transferred to the transmission 14. The damper 50 is configured to reduce oscillation from operation of the engine 12 to the input member 18 of the transmission 14 when the clutch 52 is engaged. As such, the clutch 52 and the damper 50 may both damp oscillations from the engine 12, which thus reduces the amount of oscillations being transferred to the input member 18 of the transmission 14.

Turning to FIG. 3, the clutch 52 includes a first plate 54 and a second plate 56 spaced from each other. Therefore, the clutch 52 defines an opening 58 between the first and second plates 54, 56. The first plate 54 may be secured to a portion of the damper 50 and the second plate 56 may be spaced between the first plate 54 and a portion of the turbine 38. The first and second plates 54, 56 are movable, and pressure may be applied to the first and second plates 54, 56 to move the plates 54,56, as discussed further below.

Continuing with FIG. 3, the clutch 52 also includes a friction plate 60 disposed between the first and second plates 54, 56. Specifically, the friction plate 60 may be disposed in the opening 58. The clutch 52 is operable in the slip condition in which pressure applied to the friction plate 60 via the first and second plates 54, 56 is adjustable to allow the pump 36 and the turbine 38 to slip relative to each other to control oscillation through the clutch 52 to the turbine 38. It is to be appreciated that a plurality of friction plates 60 may be disposed between the first and second plates 54, 56, and thus may be disposed in the opening 58.

The clutch 52 may be adjustable to change an amount of pressure clamping together the friction plate 60 or the friction plates 60. Therefore, depending on the desired amount of slip between the pump 36 and the turbine 38, the amount of pressure that clamps the friction plate(s) 60 together may be changed by a solenoid of the clutch 52 to allow the pump 36 and the turbine 38 to slip relative to each other.

The clutch 52 may also operate to lock the pump 36 and turbine 38 together, which allows the pump 36 and the turbine 38 to rotate that the same speed. As such, the pump 36 and the turbine 38 rotate at the same speed when the clutch 52 is in the full-lock condition. The clutch 52 is operable in the full-lock condition in which the clutch 52 locks the pump 36 and the turbine 38 together through the damper 50 such that the pump 36 and the turbine 38 rotate at the same speed. Hence, rotation of the pump 36 transfers torque through the damper 50 and the clutch 52 to the turbine 38 when the clutch 52 operates in the full-lock condition. In the full-lock condition, the pressure is applied to the friction plate(s) 60 via the first and second plates 54, 56 to lock the pump 36 and the turbine 38 together. In other words, the clutch 52 may operate to prevent slip between the pump 36 and the turbine 38.

Additionally, the clutch 52 can be configured to operate in an open condition, in which the clutch 52 is disengaged. In the open condition, the pump 36 and the turbine 38 operate through the fluid coupling 40. Therefore, the pump 36 and the turbine 38 are not locked together by the clutch 52. In other words, the clutch 52 is not being operated when in the open condition.

The damper 50 is operable upstream from the clutch 52 such that oscillation from the pump 36 is reduced by the damper 50 before oscillation reaches the clutch 52. Therefore, the clutch 52 faces a reduced amount of oscillation (oscillation from the speed of rotation of the components) across either side of the clutch 52 while in the slip condition due to the damper 50 reducing oscillation before the clutch 52. By reducing the amount of oscillation across the clutch 52, less slip is utilized by the clutch 52 to maintain a positive net speed difference between the two sides of the clutch 52. Slip may introduce energy losses that may decrease fuel economy. When the reduced amount of oscillation reaches the clutch 52 due to the damper 50 being upstream from the clutch 52, less oscillation needs to be controlled by the clutch 52 so the amount of slip may be reduced, which reduces energy loss and improves fuel economy.

Referring to FIG. 3, the casing 44 may contain the pump 36, the turbine 38, the damper 50 and the clutch 52. The order of the components inside the casing 44 assists in reducing the amount of oscillation that reaches the input member 18 of the transmission 14. As best shown in FIG. 2, the damper 50 is operable upstream from the clutch 52 and the turbine 38 relative to the direction that torque is transferred. The pump 36 is operable upstream from the damper 50, the clutch 52 and the turbine 38 relative to the direction that torque is transferred. The damper 50 is operable between the pump 36 and the clutch 52 relative to the direction that torque is transferred. The clutch 52 is operable between the damper 50 and the turbine 38 relative to the direction that torque is transferred. Therefore, simply stated, as one example, the order of the components of the torque converter assembly 32 may be the pump 36, the damper 50, the clutch 52 and the turbine 38 in the direction that torque is transferred.

Turning to FIG. 3, the damper 50 may include an input plate 62 directly coupled to the casing 44 and an output plate 64 directly coupled to the clutch 52. In certain configurations, the input plate 62 may be directly coupled to the first casing portion 46, and the output plate 64 may be directly coupled to the first plate 54. Furthermore, the input plate 62 may be secured to the plate 42 through the casing 44. Therefore, the input plate 62 of the damper 50 may be directly or indirectly attached to the plate 42 of the engine 12. As discussed above, the plate 42 is fixed to the output shaft 16 of the engine 12. As such, the input plate 62 of the damper 50 and the plate 42 of the engine 12 are secured to each other, directly or indirectly, such that the input plate 62 and the plate 42 rotate at the same speed. Furthermore, the input and output plates 62, 64 may be attached to respective parts by any suitable methods, and non-limiting examples may include fasteners, welding, adhesive, couplers, clamps, etc. It is to be appreciated that the damper 50 may include other components not specifically discussed herein, and for example, the damper 50 may include one or more springs disposed between the input and output plates 62, 64 to absorb vibrations and/or reduce oscillations outputted toward the clutch 52.

Continuing with FIG. 3, the turbine 38 may include a shell 66. The friction plate(s) 60 of the clutch 52 may be indirectly coupled to the shell 66 of the turbine 38. Therefore, torque is transferred out of the torque converter assembly 32 through the shell 66 which is ultimately coupled to the input member 18 of the transmission 14.

More specifically, the turbine 38 may include a hub 68 that is fixed to the shell 66, and the hub 68 is coupled to the input member 18 of the transmission 14. Therefore, the shell 66 and the hub 68 are secured to each other to rotate at the same speed. It is to be appreciated that the shell 66 may be fixed to the hub 68 directly or indirectly. Furthermore, the shell 66 may be fixed or attached to the hub 68 by any suitable methods, and non-limiting examples may include fasteners, welding, adhesive, couplers, clamps, etc.

Again, continuing with FIG. 3, a first part of the casing 44 and the first plate 54 define a first chamber 70. A first part of the turbine 38 and the second plate 56 define a second chamber 72. The first and second chambers 70, 72 may be filled with a first liquid fluid. Furthermore, the clutch 52 between the first and second plates 54, 56 defines a third chamber 76. The third chamber 76 may be filled with a second liquid fluid that is separated from the first liquid fluid.

One or more of the friction plates 60 may optionally define one or more grooves 74 to provide fluid communication between the first, second and third chambers 70, 72, 76. In addition to the grooves 74 or alternatively, the clutch 52 may include an arm 96 defining one or more apertures 75 to provide fluid communication between the first and second chambers 70, 72. For example, the damper 50 is in the first chamber 70, and the first liquid fluid surrounds the damper 50. Additionally, the outside of the clutch 52 is partially in the first chamber 70 and partially in the second chamber 72, and the first liquid fluid surrounds the outside of the clutch 52. The inside of the clutch 52 defines the third chamber 76, and the second liquid fluid is disposed between the first and second plates 54, 56 of the clutch 52.

The first liquid fluid may be the fluid that is distributed through the torque converter due to rotation of the pump 36. Hence, the first liquid fluid may be distributed through the pump 36, the turbine 38 and parts inside the casing 44 that define the first and second chambers 70, 72, which is supplied through a fluid passage inside a casing of the transmission 14. The torque converter assembly 32 may include a stator assembly 73 that is coupled to a stator shaft 77 defining a passage 79. The fluid passage from the transmission 14 is in fluid communication with the passage 79 of the stator shaft 77. Generally, the first liquid fluid is supplied to the pump 36 via the passage 79 of the stator shaft 77 and then to the first and second chambers 70, 72. As such, the first liquid fluid is fed into the first and second chambers 70, 72 via the pump 36 of the torque converter assembly 32, and the first liquid fluid is supplied to the pump 36 via the passage 79 of the stator shaft 77. It is to be appreciated that the liquid fluid discussed herein may exit the torque converter assembly 32 and recirculate to the transmission 14 and back again via the locations/controls discussed herein.

As discussed above, the third chamber 76 may be filled with the second liquid fluid that is separated from the first liquid fluid. Therefore, control of the first liquid fluid and control of the second liquid fluid are occur in different locations. The second liquid fluid is not distributed into and out of the third chamber 76 via the pump 36. Instead, the second liquid fluid is distributed into and out of the third chamber 76 by another fluid passage inside the transmission 14. Hence, another pump that circulates liquid fluid inside the transmission is utilized to distribute or supply the second liquid fluid to the third chamber 76. The first and second liquid fluids may be the same. Non-limiting examples of the first and second liquid fluids may include transmission fluid, oil, synthetic oil, etc.

When the clutch 52 is in the full-lock condition, the first liquid fluid is being controlled to feed the first and second chambers 70, 72 (the pump 36 is pumping the first liquid fluid to the first and second chambers 70, 72), while the second liquid fluid is not being controlled to feed the third chamber 76 (the pump of the transmission 14 is not pumping the second liquid fluid to the third chamber 76; the second liquid fluid is stagnate). When the clutch is in the open condition, the second liquid fluid is being controlled to feed the third chamber 76 (the pump of the transmission 14 is pumping the second liquid fluid to the third chamber 76), while the first liquid fluid is not being controlled to feed the first and second chambers 70, 72 (the pump 36 is not pumping the first liquid fluid to the first and second chambers 70, 72; the first liquid fluid is stagnate).

When the clutch 52 is in the slip condition, movement of the first and second plates 54, 56 may be via the solenoid, and pressure is applied to the first and second plates 54, 56 (due to operation of the solenoid) which moves the first and second plates 54, 56 and squeezes the friction plate(s) 60, and this pressure may be adjusted depending on the amount of slip that is desired between the pump 36 and the turbine 38. Therefore, the pump 36 and the turbine 38 may rotate at different speeds when the clutch 52 is in the slip condition. A centrifugal pressure may occur due to rotation speeds of, for example, the first liquid fluid, the casing 44, the damper 50, the pump 36, the turbine 38, the first plate 54, the second plate 56, and/or the second liquid fluid. For example, the first liquid fluid in the first chamber 70 rotates at the same speed as the engine 12 due to the location of the first chamber 70, and the first liquid fluid in the second chamber 72 may rotate at a different speed from the engine 12 when the clutch 52 is in the slip condition due to the location of the second chamber 72. The centrifugal pressure may increase as the radius of the volume of, for example, the first liquid fluid, increases. Thus, it is desirable to offset the centrifugal pressure from the pressure applied to the first and second plates 54, 56, which may improve controllability of the clutch 52.

Therefore, the first plate 54 and/or the second plate 56 are movable to equalize pressure between the first and second chambers 70, 72 when the clutch 52 is in the slip condition. More specifically, the first plate 54 may move to equalize pressure between the first and second chambers 70, 72, or the second plate 56 may move to equalize pressure between the first and second chambers 70, 72, or both the first and second plates 54, 56 may move to equalize pressure between the first and second chambers 70, 72. Equalizing pressure in the first and second chambers 70, 72 may improve control of the clutch 52, and may minimize cooling flow issues of the clutch 52.

The first liquid fluid is movable back and forth through the aperture(s) 75 of the arm 96 to the first and second chambers 70, 72 to equalize pressure between the first and second chambers 70, 72. When the clutch 52 applies an amount of pressure to the friction plate(s) 60, the first and/or second plates 54, 56 move accordingly, and the first liquid fluid flows between the first and second chambers 70, 72 according to the movement of the plates 42 to equalize pressure.

Pressure in the third chamber 76 is adjustable according to the pressure being equalized in the first and second chambers 70, 72. The second liquid fluid is movable into and out of the third chamber 76 depending on the movement of the first and/or second plates 54, 56 to equalize pressure between the first and second chambers 70, 72. As such, the first, second and third chambers 70, 72, 76 work together to provide a more uniform pressure along the first and second plates 54, 56, which may improve control of the clutch 52, and may minimize cooling flow issues of the clutch 52.

Continuing with FIG. 3, the torque converter assembly 32 may include a turbine shaft 78 directly coupled to the input member 18 of the transmission 14. The hub 68 of the turbine 38 may define a passageway 80 in fluid communication with the third chamber 76. Therefore, the second liquid fluid is supplied to the third chamber 76 via the passageway 80. The turbine shaft 78 may define a hole 82 in fluid communication with the passageway 80. The second liquid fluid may travel through the hole 82 of the turbine shaft 78 and the passageway 80 of the hub 68. Therefore, the second liquid fluid may travel through the turbine shaft 78 via the hole 82, through the passageway 80 of the hub 68 and into the third chamber 76. As discussed above, control of the first liquid fluid and control of the second liquid fluid are occur in different locations. For example, control of the first liquid fluid may be via the passage 79 of the stator shaft 77 which is separately from control of the second liquid fluid via the hole 82 of the turbine shaft 78. The amount of the second liquid fluid in the third chamber 76 may change depending on movement of the first and/or second plates 54, 56; and hence, a passive system may be utilized to change the amount of the second liquid fluid in the third chamber. Alternatively, an active system may be utilized to change the amount of the second liquid fluid in the third chamber.

The second liquid fluid may exit the third chamber 76 via the groove(s) 74 of the friction plate(s) 60 (due to centrifugal forces and/or pumping the second liquid fluid into the third chamber 76), and thus, the second liquid fluid may enter the first and second chambers 70, 72. The first and second liquid fluids may be fed through an outlet back into the transmission 14 before being recirculated to the separate fluid controls of the passage 79 of the stator shaft 77 and the hole 82 of the turbine shaft 78.

Continuing with FIG. 3, the hub 68 may be fixed to the shell 66. Said differently, the shell 66 may be fixed to the hub 68. The shell 66 and the hub 68 are secured to each other so that the shell 66 and the hub 68 rotate at the same speed. The input plate 62 is directly coupled to the casing 44 and abuts the hub 68 of the turbine 38 to prevent the second liquid fluid from mixing with the first liquid fluid at that location. As such, the input plate 62 of the damper 50 prevents the second liquid fluid from entering the first chamber 70 at that location. Optionally, a bushing 84 may be disposed between the input plate 62 of the damper 50 and the hub 68. Therefore, the hub 68 of the turbine 38 may directly abut the input plate 62 or indirectly abut the input plate 62 through the bushing 84.

A portion of the first plate 54 abuts the hub 68 and a portion of the second plate 56 abuts the hub 68. Generally, the passageway 80 is disposed between the portions 46, 48 of the first and second plates 54, 56. In certain configurations, the first plate 54 of the clutch 52 may include a first flange 86 that abuts the hub 68 and the second plate 56 of the clutch 52 may include a second flange 88 that abuts the hub 68. The portion of the first plate 54 may be further defined as the first flange 86, and the portion of the second plate 56 may be further defined as the second flange 88. In certain configurations, the passageway 80 may be in fluid communication with the third chamber 76 between the first and second flanges 86, 88.

Optionally, one or more seals 90 may be utilized. For example, one or more seals 90 may be disposed between the first flange 86 and the hub 68, the second flange 88 and the hub 68, the turbine shaft 78 and the hub 68, etc. Also optionally, a stop 92 may be coupled to the hub 68 to limit axial movement of the first plate 54 toward the engine 12 (or axially away from the second plate 56).

The clutch 52 may include a biasing member 94 disposed between the first and second plates 54, 56. Specifically, the biasing member 94 may be attached or secured to the first and second plates 54, 56. The biasing member 94 may be disposed closer to the hub 68 than the friction plate 60. In certain configurations, the third chamber 76 is further defined as between one side of the first plate 54 and one side of the second plate 56 of the clutch 52.

The biasing member 94 separates or splits the third chamber 76 into two halves. Simply stated, the third chamber 76 may be defined above and below the biasing member 94. The biasing member 94 defines one or more apertures 95 to provide fluid communication between the two halves of the third chamber 76. Said differently, the aperture(s) 95 may fluidly connect the two halves of the third chamber 76. Therefore, the second liquid fluid may travel through the biasing member 94 via the aperture(s) 95. The biasing member 94 transfers torque between the first and second plates 54, 56 and allows movement of the first and second plates 54, 56 relative to each other.

Again, continuing with FIG. 3, the clutch 52 may include the arm 96, and the arm 96 may be fixed to the turbine 38. More specifically, in certain configurations, the arm 96 may be fixed to the shell 66 of the turbine 38. Generally, the friction plate 60 is supported by the arm 96. For example, the friction plate 60 may be coupled to the arm 96. The friction plate(s) 60 may be splined to the arm 96 to allow movement of the friction plate(s) 60 relative to the arm 96, or the friction plate(s) 60 may be fixed to the arm 96 to prevent movement of the friction plate(s) 60 relative to the arm 96. It is to be appreciated that the arm 96 may be coupled to respective parts directly or indirectly, or may be attached or fixed to respective parts directly or indirectly. Furthermore, the arm 96 may be attached or fixed by any suitable methods, and non-limiting examples may include fasteners, welding, adhesive, couplers, clamps, etc.

In certain configurations, the arm 96, the first plate 54 and the first part of the casing 44 further define the first chamber 70. The first part of the casing 44 may be further defined as the first casing portion 46. As such, in certain configurations, the arm 96, the first plate 54 and the first casing portion 46 further define the first chamber 70. Additionally, in certain configurations, the arm 96, the second plate 56 and the first part of the turbine 38 further define the second chamber 72. The first part of the turbine 38 may be further defined as the shell 66. Therefore, in certain configurations, the arm 96, the second plate 56 and the shell 66 further define the second chamber 72. In certain configurations, one side of the first plate 54, one side of the second plate 56 and the friction member(s) 60 further define the third chamber 76. Hence, the first and second chambers 70, 72 may surround the third chamber 76.

Continuing with FIG. 3, the first plate 54 of the clutch 52 may include a first end 100A and a second end 102A spaced from each other. Furthermore, the second plate 56 of the clutch 52 may include a first end 100B and a second end 102B spaced from each other. The friction plate 60 may be disposed closer to the first end 100A of the first plate 54 than the second end 102A of the first plate 54. Additionally, the friction plate 60 may be disposed closer to the first end 100B of the second plate 56 than the second end 102B of the second plate 56. The second end 102A of the first plate 54 may be disposed closer to the hub 68 than the first end 100A of the first plate 54. Also, the second end 102B of the second plate 56 may be disposed closer to the hub 68 than the first end 100B of the second plate 56. The first flange 86 may be disposed at the second end 102A of the first plate 54, and the second flange 88 may be disposed at the second end 102B of the second plate 56.

A controller 104 may be in electrical communication with the torque converter assembly 32, the engine 12 and/or the transmission 14. In certain configurations, the controller 104 is in electrical communication with the clutch 52, and more specifically, with the solenoid of the clutch 52 which operates to control the amount of pressure applied to the friction plate(s) 60. Therefore, for example, the controller 104 may control the amount of slip (the slip condition) between the pump 36 and the turbine 38, the full-lock condition, and the open condition. Additionally, the controller 104 may control the amount of the second liquid fluid disposed in the third chamber 76. For example, the controller 104 may communicate with the pump of the transmission 14 to control the amount of the second liquid fluid in the third chamber 76; and hence the pump of the transmission 14 may operate passively to pressurize the lines and third chamber with the second liquid fluid, or actively deliver more or remove the second liquid fluid from the third chamber. Instructions may be stored in a memory 106 of the controller 104 and automatically executed via a processor 108 of the controller 104 to provide the respective control functionality.

The controller 104 is configured to execute the instructions from the memory 106, via the processor 108. For example, the controller 104 may be a host machine or distributed system, e.g., a computer such as a digital computer or microcomputer, and, as the memory 106, tangible, non-transitory computer-readable memory such as read-only memory (ROM) or flash memory. The controller 104 may also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 104 may include all software, hardware, memory 106, algorithms, connections, sensors, etc., necessary to control, for example, the clutch 52 and the amount of the second liquid fluid in the third chamber 76. As such, a control method operative to control the clutch 52 and the amount of the second liquid fluid in the third chamber 76, may be embodied as software or firmware associated with the controller 104. It is to be appreciated that the controller 104 may also include any device capable of analyzing data from various sensors, comparing data, making the necessary decisions required to control and/or monitor the clutch 52, the amount of the second liquid fluid in the third chamber 76, the torque converter assembly 32, the engine 12 and/or the transmission 14. Optionally, more than one controller 104 may be utilized.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration may be combined with one or a plurality of other desired characteristics from other configurations, resulting in other configurations not described in words or by reference to the drawings. Accordingly, such other configurations fall within the framework of the scope of the appended claims.

What is claimed is:

1. A torque converter assembly comprising:
a pump;
a turbine fluidly connected to the pump;
a damper operable upstream from the turbine and configured to reduce oscillation from the pump toward the turbine;
a clutch operable between the pump and the turbine, and the clutch includes a first plate and a second plate spaced from each other, and the clutch includes a friction plate disposed between the first and second plates;
wherein the clutch is operable in a slip condition in which pressure applied to the friction plate via the first and second plates is adjustable to allow the pump and the turbine to slip relative to each other to control oscillation through the clutch to the turbine;
wherein the damper is operable upstream from the clutch such that oscillation from the pump is reduced by the damper before oscillation reaches the clutch;
a casing that contains the pump, the turbine, the damper and the clutch;
a first part of the casing and the first plate define a first chamber;
a first part of the turbine and the second plate define a second chamber;
wherein the clutch between the first and second plates defines a third chamber;
wherein the first plate and/or the second plate are movable to equalize pressure between the first and second chambers when the clutch is in the slip condition, and pressure in the third chamber is adjustable according to the pressure being equalized in the first and second chambers;
wherein the clutch includes an arm fixed to the turbine, and the friction plate is supported via the arm; and
wherein the arm defines an aperture to provide fluid communication between the first and second chambers.

2. The assembly as set forth in claim 1 wherein:
the first and second chambers are in fluid communication with each other through the arm; and
the turbine includes a hub defining a passageway in fluid communication with the third chamber.

3. The assembly as set forth in claim 2 wherein:
the first plate of the clutch includes a first flange that abuts the hub and the second plate of the clutch includes a second flange that abuts the hub; and
the passageway is in fluid communication with the third chamber between the first and second flanges.

4. The assembly as set forth in claim 1 wherein:
the clutch includes a biasing member disposed between the first and second plates, and the biasing member is attached to the first and second plates;
the biasing member splits the third chamber into two halves; and
the biasing member defines an aperture to fluidly connect the two halves of the third chamber.

5. The assembly as set forth in claim 1 wherein:
the arm, the first plate and the first part of the casing further define the first chamber; and the arm, the second plate and the first part of the turbine further define the second chamber.

6. The assembly as set forth in claim 5 wherein:
the turbine includes a shell, and the arm is fixed to the shell of the turbine;
the first part of the turbine is further defined as the shell; and
the arm, the second plate and the shell further define the second chamber.

7. The assembly as set forth in claim 6 wherein:
the turbine includes a hub fixed to the shell;
a portion of the first plate abuts the hub and a portion of the second plate abuts the hub; and
the hub defines a passageway in fluid communication with the third chamber.

8. The assembly as set forth in claim 1 wherein:
the pump is rotatable to transfer torque through the damper and the clutch to the turbine when the clutch is operable in the slip condition or a full-lock condition; and
the damper is operable upstream from the clutch and the turbine relative to a direction that torque is transferred.

9. The assembly as set forth in claim 8 wherein:
the pump is operable upstream from the damper, the clutch and the turbine relative to the direction that torque is transferred;
the damper is operable between the pump and the clutch relative to the direction that torque is transferred; and
the clutch is operable between the damper and the turbine relative to the direction that torque is transferred.

10. The assembly as set forth in claim 1 wherein:
the damper includes an input plate directly coupled to the casing and an output plate directly coupled to the first plate;
the first plate of the clutch includes a first end and a second end spaced from each other;
the second plate of the clutch includes a first end and a second end spaced from each other;
the friction plate is disposed closer to the first end of the first plate than the second end of the first plate, and the friction plate is disposed closer to the first end of the second plate than the second end of the second plate;
the turbine includes a hub defining a passageway in fluid communication with the third chamber, and the second end of the first plate is disposed closer to the hub than the first end of the first plate, and the second end of the second plate is disposed closer to the hub than the first end of the second plate;
the turbine includes a shell that is fixed to the hub;
the arm is fixed to the shell of the turbine;
the clutch includes a biasing member attached to the first and second plates, and the biasing member is disposed closer to the hub than the friction plate;
the first chamber and the second chamber are in fluid communication with each other through the arm, and the first and second chambers are filled with a first liquid fluid; and
the third chamber is filled with a second liquid fluid that is separated from the first liquid fluid.

11. A torque converter assembly comprising:
a pump;
a turbine fluidly connected to the pump;
a damper operable upstream from the turbine and configured to reduce oscillation from the pump toward the turbine;
a clutch operable between the pump and the turbine, and the clutch includes a first plate and a second plate spaced from each other, and the clutch includes a friction plate disposed between the first and second plates;
wherein the damper is operable upstream from the clutch such that oscillation from the pump is reduced by the damper before oscillation reaches the clutch;
a casing that contains the pump, the turbine, the damper and the clutch;
a first part of the casing and the first plate define a first chamber;
a first part of the turbine and the second plate define a second chamber;
wherein:
the clutch between the first and second plates defines a third chamber;
the first chamber and the second chamber are filled with a first liquid fluid, and the third chamber is filled with a second liquid fluid that is separated from the first liquid fluid;
the clutch includes an arm fixed to the turbine, and the arm supports the friction plate;
the first and second chambers are in fluid communication with each other through the arm;
the turbine includes a hub defining a passageway in fluid communication with the third chamber; and
the damper includes an input plate directly coupled to the casing and abuts the hub of the turbine to prevent the second liquid fluid from mixing with the first liquid fluid at that location.

12. The assembly as set forth in claim 11 wherein:
the clutch includes a biasing member attached to the first and second plates;
the biasing member is disposed closer to the hub than the friction plate;
the biasing member splits the third chamber into two halves; and
the biasing member defines an aperture to fluidly connect the two halves of the third chamber.

13. A vehicle comprising:
an engine including an output shaft;
a transmission including an input member;
a torque converter assembly operable between the output shaft and the input member, wherein the torque converter assembly comprises:
a pump;
a turbine fluidly connected to the pump, and the turbine includes a shell;
a damper operable upstream from the turbine and configured to reduce oscillation from the pump toward the turbine;
a clutch operable between the pump and the turbine, and the clutch includes a first plate and a second plate spaced from each other, and the clutch includes a friction plate disposed between the first and second plates;
wherein the clutch includes an arm fixed to the shell of the turbine, and the friction plate is supported via the arm;
wherein the clutch is operable in a slip condition in which pressure applied to the friction plate via the first and second plates is adjustable to allow the pump and the turbine to slip relative to each other to control oscillation through the clutch to the turbine;
wherein the damper is operable upstream from the clutch such that oscillation from the pump is reduced by the damper before oscillation reaches the clutch;

a casing contains the pump, the turbine, the damper and the clutch;
a first part of the casing, the arm, and the first plate cooperate to define a first chamber, and the damper is disposed inside of the first chamber;
a first part of the turbine and the second plate cooperate to define a second chamber;
wherein the clutch between the first and second plates defines a third chamber; and
wherein the first plate and/or the second plate are movable to equalize pressure between the first and second chambers when the clutch is in the slip condition, and pressure in the third chamber is adjustable according to the pressure being equalized in the first and second chambers.

14. The vehicle as set forth in claim 13 wherein:
the first and second chambers are in fluid communication with each other through the arm;
the turbine includes a hub defining a passageway in fluid communication with the third chamber;
the torque converter assembly includes a turbine shaft directly coupled to the input member of the transmission; and
the turbine shaft defines a hole in fluid communication with the passageway.

15. The vehicle as set forth in claim 14 wherein:
the damper includes an input plate directly coupled to the casing and an output plate directly coupled to the first plate;
the first chamber and the second chamber are filled with a first liquid fluid, and the third chamber is filled with a second liquid fluid that is separated from the first liquid fluid, and the second liquid fluid travels through the hole of the turbine shaft and the passageway of the hub; and
the input plate is directly coupled to the casing and abuts the hub of the turbine to prevent the second liquid fluid from mixing with the first liquid fluid at that location.

16. The vehicle as set forth in claim 13:
further including a plate fixed to the output shaft of the engine, and the casing is fixed to the plate; and
wherein the damper includes an input plate secured to the plate through the casing and an output plate directly coupled to the first plate.

17. The vehicle as set forth in claim 13 wherein:
the output shaft of the engine is rotatable to transfer torque in a direction to the input member of the transmission through the torque converter assembly; and
the damper is operable upstream from the clutch and the turbine relative to the direction that torque is transferred.

18. The vehicle as set forth in claim 13 wherein:
the damper includes an input plate directly coupled to the casing and an output plate directly coupled to the first plate;
the first plate of the clutch includes a first end and a second end spaced from each other;
the second plate of the clutch includes a first end and a second end spaced from each other;
the friction plate is disposed closer to the first end of the first plate than the second end of the first plate, and the friction plate is disposed closer to the first end of the second plate than the second end of the second plate;
the turbine includes a hub defining a passageway in fluid communication with the third chamber, and the second end of the first plate is disposed closer to the hub than the first end of the first plate, and the second end of the second plate is disposed closer to the hub than the first end of the second plate;
the turbine includes the shell is fixed to the hub;
the clutch includes a biasing member attached to the first and second plates, and the biasing member is disposed closer to the hub than the friction plate;
the first chamber and the second chamber are in fluid communication with each other through the arm, and the first and second chambers are filled with a first liquid fluid; and
the third chamber is filled with a second liquid fluid that is separated from the first liquid fluid.

19. The vehicle as set forth in claim 13:
further including a stator assembly that is coupled to a stator shaft that defines a passage, and a first liquid fluid is supplied to the pump via the passage of the stator shaft and then to the first and second chambers;
wherein the turbine includes a hub defining a passageway in fluid communication with the third chamber;
wherein the torque converter assembly includes a turbine shaft directly coupled to the input member of the transmission;
wherein the turbine shaft defines a hole in fluid communication with the passageway, and a second liquid fluid is supplied to the third chamber via the passageway; and
wherein control of the first liquid fluid via the passage of the stator shaft which is separately from control of the second liquid fluid via the hole of the turbine shaft.

20. The vehicle as set forth in claim 13 wherein the damper is directly secured to the casing.

* * * * *